United States Patent
Wilson et al.

(10) Patent No.: US 7,072,726 B2
(45) Date of Patent: Jul. 4, 2006

(54) CONVERTING M CHANNELS OF DIGITAL AUDIO DATA INTO N CHANNELS OF DIGITAL AUDIO DATA

(75) Inventors: Mei L. Wilson, Redmond, WA (US); Shafiq ur Rahman, Redmond, WA (US); Rebecca C. Weiss, Kirkland, WA (US); Brian Crites, Sammamish, WA (US); Sohail Baig Mohammed, Redmond, WA (US); Michael A. Wall, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 10/175,431

(22) Filed: Jun. 19, 2002

(65) Prior Publication Data

US 2003/0236580 A1    Dec. 25, 2003

(51) Int. Cl.
*G06F 17/00* (2006.01)
*H04B 1/00* (2006.01)

(52) U.S. Cl. ........................................ 700/94; 381/119
(58) Field of Classification Search ............... 381/119, 381/27, 307, 19, 20, 21, 22, 23; 369/4; 700/94
See application file for complete search history.

(56) References Cited

U.S. PATENT DOCUMENTS

| | | | |
|---|---|---|---|
| 5,630,175 A | 5/1997 | Gajewski et al. | |
| 5,642,422 A | 6/1997 | Hon et al. | |
| 5,787,259 A | 7/1998 | Haroun et al. | |
| 5,850,456 A * | 12/1998 | Ten Kate et al. | 381/23 |
| 5,857,026 A * | 1/1999 | Scheiber | 381/23 |
| 5,969,654 A | 10/1999 | Goldin | |
| 6,002,352 A | 12/1999 | El-Ghoroury et al. | |
| 6,263,313 B1 | 7/2001 | Milsted et al. | |
| 6,311,161 B1 | 10/2001 | Anderson et al. | |
| 6,345,279 B1 | 2/2002 | Li et al. | |
| 6,449,368 B1 * | 9/2002 | Davis et al. | 381/1 |
| 6,470,087 B1 * | 10/2002 | Heo et al. | 381/17 |
| 6,580,671 B1 * | 6/2003 | Otomo et al. | 369/47.15 |
| 6,788,880 B1 * | 9/2004 | Fuchigami et al. | 386/96 |
| 6,931,291 B1 * | 8/2005 | Alvarez-Tinoco et al. | 700/94 |
| 2001/0014159 A1 * | 8/2001 | Masuda | 381/22 |

\* cited by examiner

*Primary Examiner*—Sinh Tran
*Assistant Examiner*—Andrew C. Flanders
(74) *Attorney, Agent, or Firm*—Senniger Powers

(57) ABSTRACT

Audio data having M channels includes a header with metadata specifying a conversion function for converting the M channels of digital audio data into N channels of data. The metadata is a string of coefficients, which may be specified by the content author, to define to conversion of the M channels of digital audio data into N channels.

12 Claims, 5 Drawing Sheets

FIG. 3

CONVERTING M CHANNELS OF DIGITAL AUDIO DATA INTO N CHANNELS OF DIGITAL AUDIO DATA

TECHNICAL FIELD

The present invention relates to the field of multi-channel digital audio data. In particular, this invention relates to a system for playing back content with a different number of channels than originally specified and, specifically, converting M channels of digital audio data into N channels of digital audio data, where M and N are integers.

BACKGROUND OF THE INVENTION

Currently, media platforms support various channels of digital audio data and destination devices are able to reproduce various formats and number of channels of digital audio data. In at least some cases, the platforms supplying the stream of digital audio data may be providing a number of channels (e.g., M channels, where M is an integer) which is different than the number of channels which can be employed by the destination device (e.g., N channels, where N is an integer and M>N). For example, many websites supply 5.1 audio information (e.g., 6 channels) whereas many computers accessing the audio information on the websites only have a stereo speaker system setup (e.g., 2 channels). This leads to the need to fold 5.1 channels down to stereo. Alternatively, a 5.1 system receiving stereo leads to the need to fold stereo up to 5.1 channels. In the past, this has been accomplished to some extent by a predetermined default, referred to as "speaker filling" or "simulated surround," which is specified by the receiving device. In at least some circumstances, it would be preferable to give control to the content author of the digital audio data so that the content author can specify how the convert from M to N channels. Moving forward in the future, 6.1 will be available and it is possible that additional numbers of channels, such as 7.1 channels (e.g. 8 channels), or even more channels and/or formats will be available for consumers. Thus, an extensible data storage format is needed to enable the media format to continue to support converting requirements without changing the definition for this area.

For these reasons, a system and method for permitting a system having N audio channels to receive and reproduce digital audio data having M channels is desired to address one or more of these and other disadvantages.

SUMMARY OF THE INVENTION

The invention includes a conversion system and method for fold-down and/or fold-up of data. In one form, the invention includes metadata in the header of an M-channel audio stream, which metadata defines a fold-down to N channels of digital audio data.

This M×N fold-down data format manipulation and storage according to the invention provides a very extensible solution for saving and retrieving fold-down data from M channels to N channels in various media formats. In particular, the M×N fold-down data format manipulation and storage according to the invention enables the media content authoring applications to specify freely the fold-down data from M channels to N channels. It also enables the media content player applications or the decoder of the coder/decoder (codec) to dynamically parse the fold-down data and properly configure the rendering pipeline correctly.

In accordance with one aspect of the invention, a modulated data signal comprises audio data having M channels and including a data field encoded thereon defining a conversion function. The data field has metadata specifying coefficients for converting the M channels of the audio data into N channels of audio data for use by a destination device having an N channel audio player.

In accordance with another aspect of the invention, a computer readable medium has stored thereon a data structure comprising audio data having M channels and including a header. The header includes metadata specifying a conversion function for converting the M channels of the audio data into N channels of data.

In accordance with another aspect of the invention, a method of transmitting an audio stream comprises sending an audio stream having M channels of data and sending metadata specifying a conversion function for converting the M channels of data of the audio stream into N channels of data.

In accordance with another aspect of the invention, in a computer system, a method comprises receiving a data structure that holds an incoming audio stream of M channels of data, the incoming stream comprising samples that are stored in packets in the data structure. A header includes conversion data that was stored in the header prior to a request being transmitted by the computer system that caused the data structure to be received. The conversion data defines a function for converting the M channels of data of the incoming audio stream into N channels of data for use by a destination device. The method includes extracting the conversion data from the header as needed to convert the incoming audio stream.

In accordance with another aspect of the invention, a data processing system has a source computer with a storage and a data structure stored in the storage for encapsulating a digital audio data stream of M channels of data into an aggregated data stream defined by the data structure. Data from the data streams is incorporated in packets prior to a request being received by the source computer to transmit the aggregated data stream to a destination computer. Conversion data in a header defines a function for converting the M channels of data of the audio stream into N channels of data for use by the destination computer.

In accordance with another aspect of the invention, in a computer system operable for connecting to a communications channel, a method of encapsulating an audio stream of M channels of data into an aggregated data stream to be transmitted on the communications channel comprising:

determining a packet size for the communications channel; storing, on a storage device, at least one packet containing information about the aggregated data stream to form a header section in a data structure that defines the aggregated data stream;

storing, on the storage device, packets containing samples of data from the multiple data streams to form a data section in the data structure;

designating a portion of the header for holding conversion data; and storing, on the storage device, conversion data in the designated portion of the header, wherein the conversion data defines a function for converting the M channels of data of the audio stream into N channels of data for use by a destination computer, and further wherein the aggregated data stream is stored on the storage device prior to receiving a request for transmission of the aggregated data stream on the communications channel from the destination computer.

Alternatively, the invention may comprise various other methods and apparatuses.

Other features will be in part apparent and in part pointed out hereinafter.

BRIEF DESCRIPTION OF THE DRAWINGS

FIG. 3 illustrates a screen shot of a window for one exemplary embodiment of the invention which identifies the fold-down name/value information in an active stream format header.

Corresponding reference characters indicate corresponding parts throughout the drawings.

DETAILED DESCRIPTION OF THE INVENTION

Figure 1:
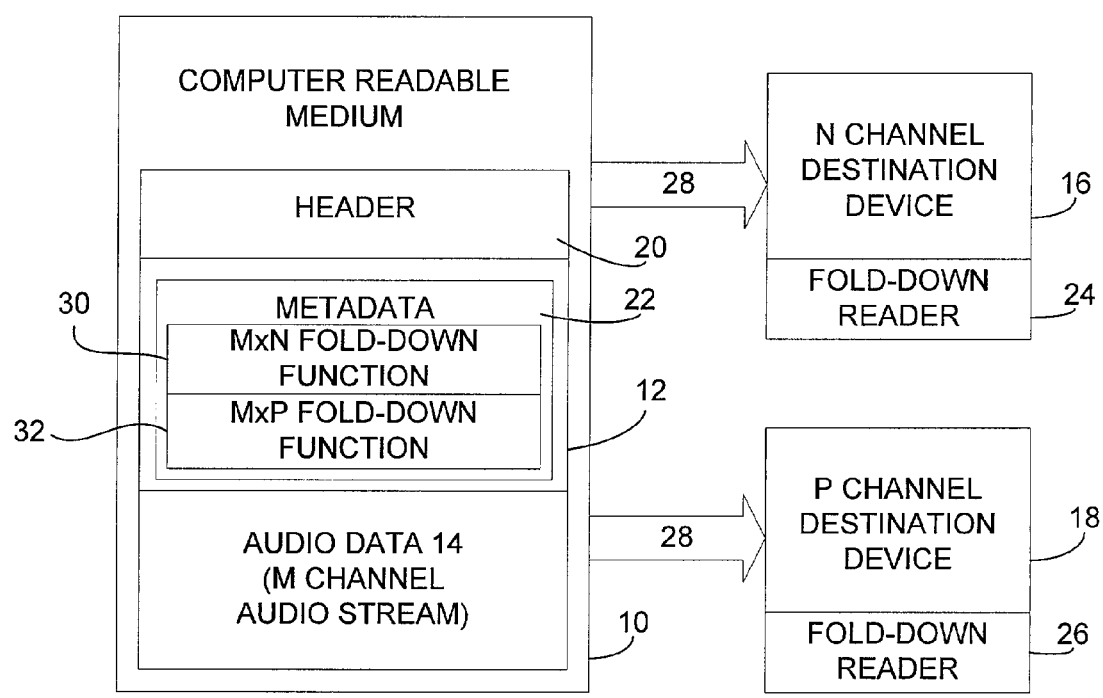
FIG. 1 is a block diagram illustrating an exemplary computer-readable medium on which the invention may be stored and the system and method of transmitting an M channel audio stream to an N channel destination device and to a P channel destination device.

Referring first to FIG. 1, a block diagram is provided to illustrate an exemplary computer-readable medium on which the invention may be stored and to illustrate the system and method of transmitting an M channel audio stream to an N channel destination device and to a P channel destination device. Reference character 10 generally refers to a computer readable medium having stored thereon a data structure 12 comprising digital audio data 14. The medium 10 may be any fixed or removable storage such a hard drive, disk or CD-ROM (see FIG. 5, below). Although it is contemplated that the medium 10 may have additional data thereon, such as other audio data, video data or other data, such additional data is optional.

The digital audio data 14 includes M channels of audio data. For example, an audio file in a 5.1 format would have six channels of digital data, as noted in the example below. Frequently, the M channels of digital audio data are being provided or used by a device that is capable of decoding, processing, reproducing or otherwise handling a number channels of audio data which may be different than M. For example, the audio data 14 may be provided to an N channel destination device 16 where N<M. As another example, the audio data 14 may be provided to a P channel destination device 18 where P>M. As another example, the audio data 14 may be provided to a P channel destination device 18 where P<M and P and N are different. (As a specific example, see below relating to a two channel stereo device receiving six channels of audio data in a 5.1 format.) Some formats of audio data are not necessarily compatible with other formats and some devices which are designed to handle N or P channels of audio may not be capable of handling M channels of audio, where M is different than N or P. In addition, some devices which handle a certain number of channels of audio may have default setting for other handling another number of channels of audio and these default settings may not be optimum or desirable for certain audio files. Thus, the destination devices 16, 18 need to convert the M channels of audio data into N and P channels, respectively. Furthermore, content authors of audio files may wish to control how this conversion takes place on a per-file or per-stream basis. In addition, in some systems and methods it may be desirable to control the conversion on a more granular level. For example, conversion may be controlled by a separate data stream and might be continuously or discretely varying so that the conversion is discretely or continuously adjustable. This optional feature is contemplated and may be enabled in the embodiments noted below.

Thus, in one form of the invention, the data structure 12 which is transmitted to destination devices 16, 18 includes a header 20 with metadata 22 specifying a conversion function such as a fold-down function 30 for converting the M channels of the audio data into N channels of data, where M>N. As used herein, this is referred to a fold-down because the destination device has less channels than the audio data source. The invention also contemplates a fold-up function where the destination device has more channels than the audio data source (e.g., M<N). Alternatively or in addition, the header 20 with metadata 22 may optionally also specify a second fold-down function 32 for converting the M channels of the audio data into P channels of data. Alternatively or in addition, the fold-up or fold-down function may optionally include a channel mask parameter which specifies a particular format for the audio data source and/or for the destination device (see below for a more detailed explanation of this aspect of the invention). For handling this, each media program or other software of the destination devices 16, 18 is provided with a conversion reader such as a fold-down reader 24, 26 for reading the fold-down functions 30, 32 embedded in the transmitted header 20. The readers 24, 26 are either aware of the configuration of the device on which they are resident or can determine its configuration. Knowing the configuration, the reader then finds the appropriate fold-down function 30, 32 in the header 20 for converting the audio data 14 into a format and/or number of channels which can be handled by the destination device.

For example, suppose M=6 for a 5.1 format. Also, suppose that device 16 is a 2 channel stereo device (left and right channels so that N=2) and that device 18 is a 4 channel surround sound device (left, right, center and rear channels so that P=4). Finally, suppose that the metadata 22 includes a 6×2 fold-down function such as fold-down function 30 and a 4×2 fold-down function such as fold-down function 32. When the audio data 14 is received by 2 channel device 16, reader 24 will either know or determine that device 16 has a configuration which is capable of handling 2 channels of audio and will use the 6×2 fold-down function specified in the header 20 to convert the audio data 14 to 2 channels of audio. When the audio data 14 is received by 4 channel device 18, reader 24 will either know or determine that device 18 has a configuration which capable of handling 4 channels of audio and will use the 6×4 fold-down function specified in the header 20 to convert the audio data 14 to 4 channels of audio.

In one form, the invention comprises a data processing system having a source computer with storage 10. Data structure 12 is stored in the storage 10 for encapsulating a digital audio data stream 14 of M channels of data into an aggregated data stream defined by the data structure. Data from the aggregated data streams is incorporated in packets prior to a request being received by the source computer to transmit the aggregated data stream to one or more destination devices 16, 18. In one form, the devices 16, 18 may each be a computer. Conversion data includes fold-down data and/or fold-up data in a header of an ASF file including packets of the audio information to define a function for converting the M channels of data of the audio stream into N channels of data for use by the destination computer 16, 18. The packets in an ASF file contain the audio (and/or video bits). The metadata (which is where the conversion data is located) is contained in the ASF header, which is the first section of the ASF file. The header may also contain other information about the content, in addition to metadata; in general, it may contain all the various "descriptions".

In another aspect, the invention comprises a modulated data signal 28 having audio data 14 with M channels and having a data field (e.g., metadata 22) encoded thereon. The data field defines a fold-down function 30, 32 specifying coefficients for converting the M channels of the audio data into N channels of audio data for use by the destination device 16 having an N channel audio player and or for use by the destination device 18 having a P channel audio player.

In general, an M to N fold-down according to the invention from a Y audio data set having M channels ($Y_1$–$Y_M$ channels) to an X audio data set having N channels ($X_1$–$X_N$ channels) would take the following general form:

$$X_A = \sum_{j=1}^{M} K_{Aj} Y_j \quad \text{(for } A = 1 \text{ to } N\text{).} \tag{1}$$

Or

Channel($X_A$)=$K_{A1}$*Channel($Y_1$)+$K_{A2}$*Channel($Y_2$)+ . . . +$K_{AM}$*Channel($Y_M$) for A=1 to N. The coefficients $K_{Aj}$ are selected by the content author and may be referred to as mix down or fold-down coefficients. For example, $K_{A2}$ could be linear coefficients which indicate the mix down level in dB to be applied to Channel($Y_2$) when folding down this channel.

Example of 6 Channel To 2 Channel Fold-Down

In general, a 6×2 fold-down from a 5.1 audio stream to a stereo audio data would take the following form. A 5.1 audio stream has the following six channels of digital data:
1. L(M) is the left front channel data of the 5.1 audio stream;
2. R(M) is the right front channel data of the 5.1 audio stream;
3. C(M) is the center channel data of the 5.1 audio stream;
4. LS(M) is the left surround channel data of the 5.1 audio stream;
5. RS(M) is the right surround channel data of the 5.1 audio stream; and
6. LFE(M) is the low frequency channel data of the 5.1 audio stream (which usually is reproduced by a separate speaker such as a subwoofer).

In contrast, a destination device such as device 16 which plays stereo audio data is configured to receive the following two channels of data:
1. L(N) is the left channel data for the left channel of the stereo destination device; and
2. R(N) is the right channel data for the right channel of the stereo destination device;

Thus, the six channels of digital information must be converted to two channels of digital information for use by the stereo player of the destination device.

According to one aspect of the invention, the conversion would take the following form:

$$L(N)=B*[L(M)+SMIX*LS(M)+CMIX*C(M)+ \\ LFEMIX*LFE(M)] \tag{2}$$

and $$R(N)=B*[R(M)+SMIX*RS(M)+CMIX*C(M)+ \\ LFEMIX*LFE(M)] \tag{3}$$

In this conversion, L(M) maps directly to L(N) and the other channels are weighted by linear coefficients SMIX (SurroundMIX), CMIX (CenterMIX), and LFEMIX (Low FrEquency MIX). SMIX, CMIX and LFEMIX may be referred to as mix down coefficients or fold-down coefficients. For example, SMIX (Surround MIX) would indicate the linear coefficients to be applied to the left surround LS(M) and the right surround RS(M) channels when folding down to left and right stereo channels L(N) and R(N). CMIX (Center MIX) would indicate the linear coefficients to be applied to the center channel C(M) when folding down to left and right stereo channels L(N) and R(N). LFEMIX (Low FrEquency MIX) would indicate the linear coefficients to apply to the low frequency channel LFE(M) when folding down to left and right stereo channels L(N) and R(N). To avoid overloading the resultant L(N) and R(N) channels, each coefficient is weighted by B before converting to the format of the media coder/decoder (codec). Thus, $$B=1/(1+SMIX+CMIX+LFEMIX)$$

B, SMIX, CMIX and LFEMIX are linear coefficient which may be determined, arbitrary, preset or predefined by the content author. The values of the coefficients are specified in an encoder user interface (or other media content authoring applications) as mix levels in dB. In the 6×2 conversion noted above, the same coefficients are used for converting the left and right channels. However, it is contemplated that each coefficient may be uniquely defined as indicated in the general case noted above (see equation 1). For example, the conversion may take the following more general form:

$$L(N)=LMIX_L*L(M)+RMIX_L*R(M)+SMIX_L*LS(M)+ \\ SMIX_L*RS(M)+CMIX_L*C(M)+LFEMIX_L*LFE \\ (M)$$

and $$R(N)=RMIX_R R(M)+LMIX_R L(M)+SMIX_R*RS(M)+ \\ SMIX_R*LS(M)+CMIX_R*C(M)+LFEMIX_R*LFE \\ (M)$$

where $LMIX_L$, $RMIX_L$, $SMIX_L$, $CMIX_L$, $LFEMIX_L$, $RMIX_R$, $LMIX_R$, $SMIX_R$, $CMIX_R$, and $LFEMIX_R$ are coefficients specified by the content author in the metadata of the audio data or are calculated from values specified by the content author in the metadata of the audio data.

Translation of the linear coefficients fold-down values to logarithmic values that a media codec (and mixer) accepts will be performed in the encoder (or other media content authoring applications). For the conversion specified by equations (2) and (3) above and for codecs which usually require log values scaled by 65536, the resulting log units may be specified by the following mix table:

TABLE 1

MATRIX OF COEFFICIENTS

|      | L(M)      | R(M)      | C(M) | LFE(M) | LS(M)     | RS(M)     |
|------|-----------|-----------|------|--------|-----------|-----------|
| L(N) | W         | -INFINITE | Y    | Z      | X         | -INFINITE |
| R(N) | -INFINITE | W         | Y    | Z      | -INFINITE | X         | wherein:
 $W = 20*65536*\log_{10}(B)$;
 $X = 20*65536*\log_{10}(SMIX*B)$;
 $Y = 20*65536*\log_{10}(CMIX*B)$;
 $Z = 20*65536*\log_{10}(LFEMIX*B)$; and
 $-\text{INFINITE} = 0\times 80000000\ (-2147483648)$.

In this configuration, the metadata would have the following string format representation for the mix table:
 W,-INFINITE,-INFINTE,W,Y,Y,Z,Z,X,-INFINITE,-INFINITE,X.

It should be noted that the scaling factor B is somewhat arbitrary and dependant on the system requirements and data representation involved. In this case, the factor has been chosen for future compatibility with Windows brand KMIXER. This is a component in the operating system that performs the conversion in general M×N cases. However, it does not currently have mutable values which can be accessed through application program interfaces (APIs).

As a specific example, suppose a content author would like to specify the following 6×2 channel mix down in accordance with the equations (2) and (3) above:
 SurroundMix (SMIX)=−4 db
 CenterMix (CMIX)=−5 dB
 LowFrequencyMix(LFEMIX)=−12 dB.

In practice, the values will be treated as floating point numbers to increase the accuracy of the calculated coefficients. In the following example, the values are calculated to three digits of precision for clarity.

First, the db value are normalized with following calculation:

$$SMIX = 10^{(-4/20)} = 0.631;$$

$$CMIX = 10^{(-5/20)} = 0.562;$$

$$LFEMIX = 10^{(-12/20)} = 0.251;$$

For example, these values can be calculated using the following C source code excerpt:
 double SMIX=pow(10.0, ((double)−4)/20 ) so that
 double CMIX =pow(10.0, ((double)−5)/20) so that
 double LFEMIX=pow(10.0, ((double)−12)/20 ) so that For these values, $$B = 1/(1+SMIX+CMIX+LFEMIX) = 1/(1+0.631+0.562+0.251) = 1/2.444 = 0.409$$

For this B, the coefficients are:

$$W = 20*65536*\log_{10}(B) = 20*65536*\log_{10}(0.409) = -508692;$$

$$X = 20*65536*\log_{10}(SMIX*B) = 20*65536*\log_{10}(SMIX*0.409) = -771028;$$

$$Y = 20*65536*\log_{10}(CMIX*B) = 20*65536*\log_{10}(CMIX*0.409) = -836948;$$

$$Z = 20*65536*\log_{10}(LFEMIX*B) = 20*65536*\log_{10}(LFEMIX*0.409) = -1295782;$$

and $-\text{INFINITE} = 0\times 80000000\ (-2147483648)$.

For these coefficients, the string format representation for the mix table is:
 −508692, −2147483648, −2147483648, −508692, −836948, −836948, −1295782, −1295782, −771028, −2147483648, −2147483648, −771028.

For a floating point calculation, the string would be:
 −508805, −2147483648, −2147483648, −508805, −836485, −836485, −1295237, −1295237, −770949, −2147483648, −2147483648, −770949

The implementation for M×N fold-down data format manipulation and storage is designed to enable:
 1. media content authors and authoring applications to specify the number of M and N channels;
 2. media content authors and authoring applications to specify an M×N matrix of integers in string format;
 3. media content play-back applications (including fold-down readers) to dynamically determine the number of original channels and number of destination channels; and
 4. media content play-back applications (including fold-down readers) to parse the string to obtain M×N matrix of integers.

As noted above, the M×N fold-down data is saved as metadata. In one form, a metadata name for M×N fold-down data may be "Fold % dto % DdChannels", where "% d" and "% D" will be filled in by media content authoring applications. For example, "Fold-Down6to2Channels" could be the name for a fold-down of six channels (5.1 audio) to two channels. As noted above, the value for M×N fold-down data is in string format which contains M×N integers and separated by commas. For example, the string may be "1,2,3,4,5,6,7,8,9,10,11,12".

Once this M×N fold-down data is stored in a media format, it can be parsed by the media content playback applications. For example, this data along with the speaker configuration may be passed to a technologies player such as the WINDOWS MEDIA WMA Professional codec to perform the fold-down process.

Figure 2:
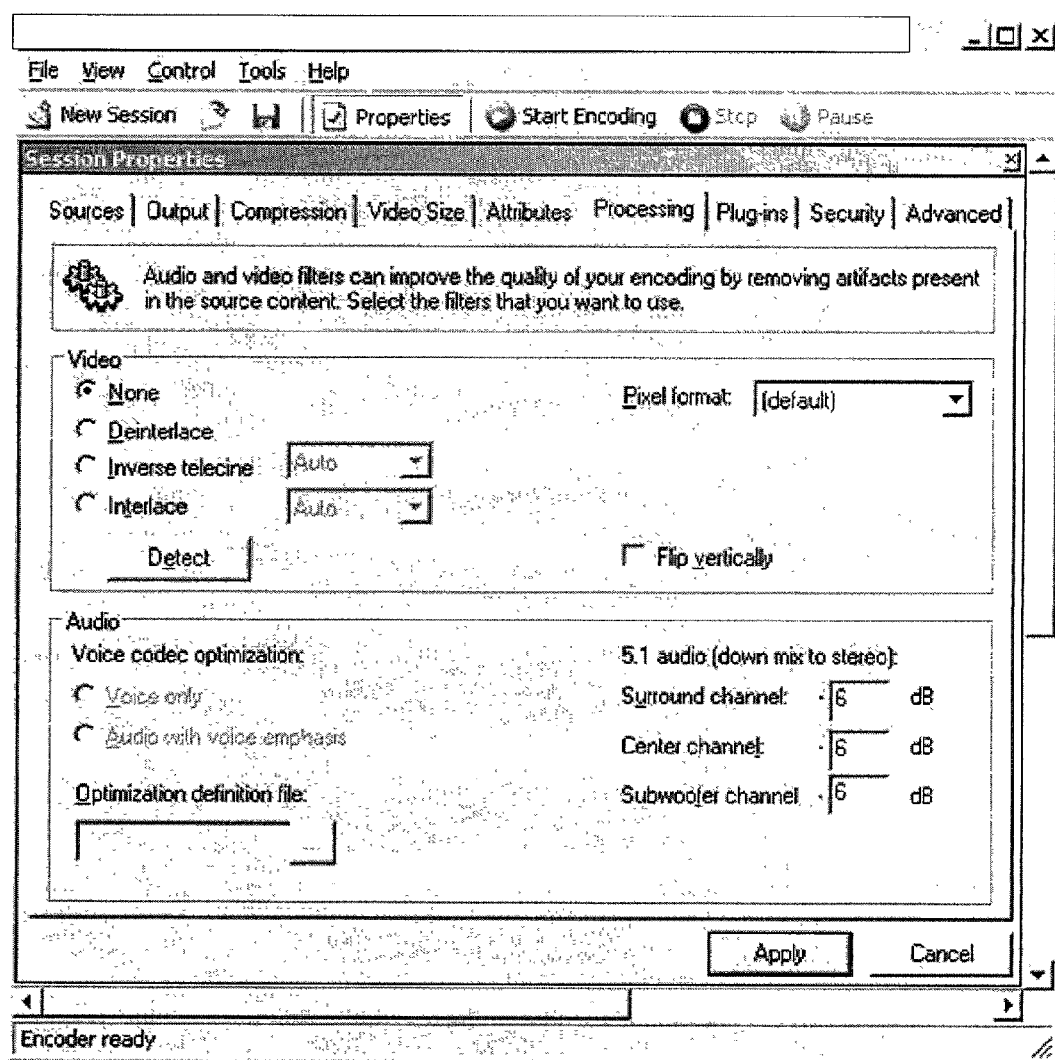
FIG. 2 illustrates a screen shot for an encoder for one exemplary embodiment of the invention which allows the content author to specify the down mix from the 5.1 audio to stereo (e.g., −6 dB for the surround, center and subwoofer channels).
Figure 3:
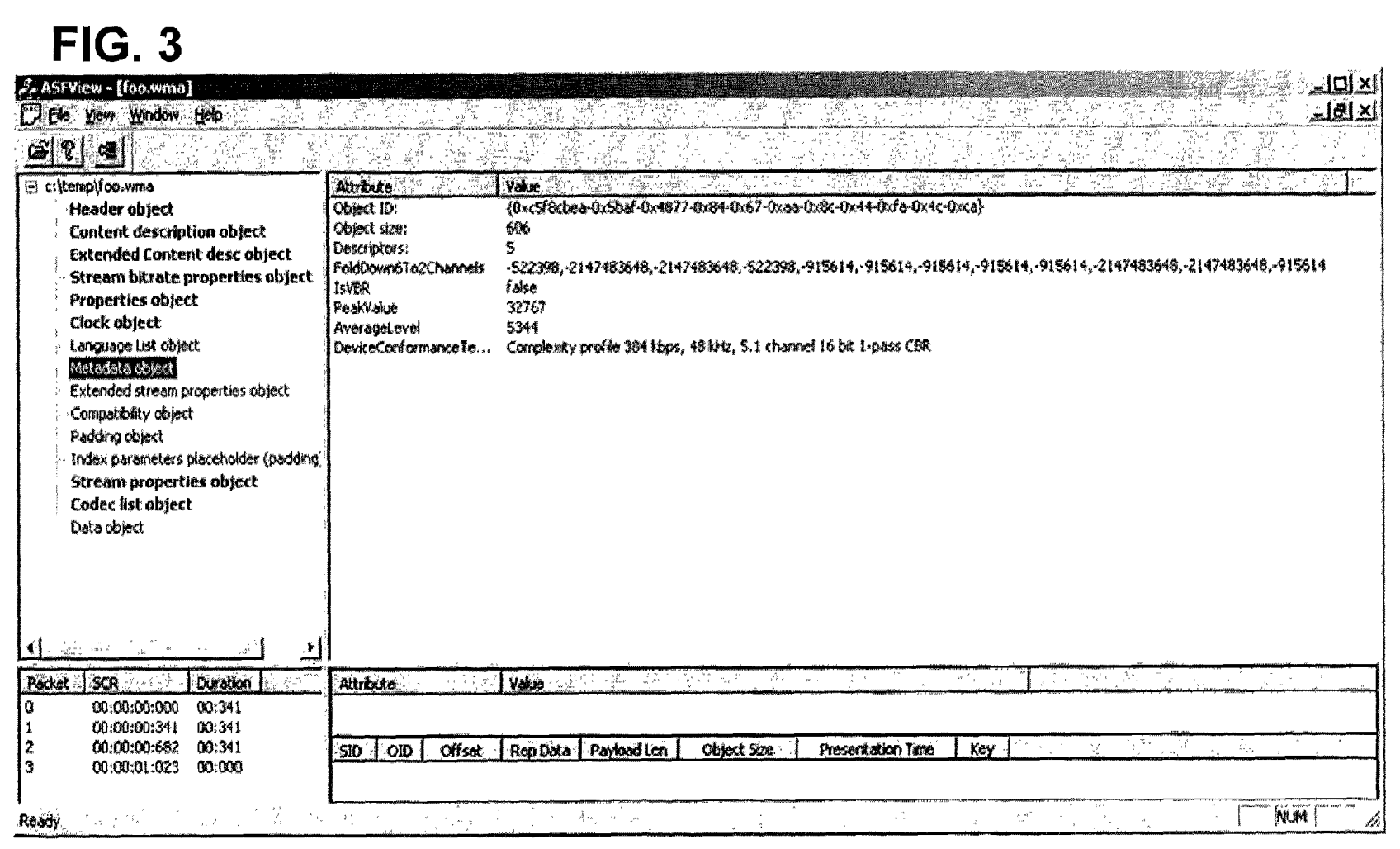

Referring next to FIGS. 2 and 3, these illustrations indicate screen shots for a 6×2 fold-down example. In particular, FIG. 2 is an example of a window which may be part of WINDOWS MEDIA Encoder for permitting a content author to encode 5.1-channel audio and control how it will be folded-down to stereo in the player application. In the window illustrated, the author has selected a −6 dB down mix for each of the surround, center and subwoofer channels (e.g. for SMIX, CMIX and LFEMIX). By applying this fold-down, the encoder would embed a coefficient stream in the metadata of transmitted audio to specify the −6 dB fold-down (see the example above for more details). FIG. 3 is a metadata object in a header. FIG. 3 illustrates the contents of a metadata object in a header of an active streaming format (ASF) (or advanced streaming format or advanced system format) file which indicates the resulting coefficient string.

Channel Ordering and Format

In the above regarding M×N conversion, the order of the channels that make up the N final outputs has been assumed and it has also been assumed that each number (M, N, P, etc.) has only one corresponding format. In particular, the above does not specify the ordering of the channels. For example, assume a 6×4 matrix. Assume further that the destination device has 4 channels: Front Left (FL), Front Right(FR), Back Left(BL) and Back Right(BR). The matrix does not indicate the order of the channels, e.g., FL, FR, BL, BR; or e.g., FL, BL, FR, BR; etc. The above assumes a predefined ordering. For example, one predefined order may be as follows:
Front Left—FL
Front Right—FR
Front Center—FC
Low Frequency—LF
Back Left—BL
Back Right—BR
Front Left of Center—FLC
Front Right of Center—FRC
Back Center—BC
Side Left—SL
Side Right—SR
Top Center—TC
Top Front Left—TFL
Top Front Center—TFC
Top Front Right—TFR
Top Back Left—TBL
Top Back Center—TBC
Top Back Right—TBR Thus, the invention contemplates that the metadata string may employ a preset ordering or that information can be provided in the metadata string to identify the particular order that is being used.

In addition, it is also contemplated that the metadata string according to the invention may take into account the fact that some numbered channels may have multiple formats. For example, in a 6×4 fold down, the destination device needs to know if the matrix is for a quadraphonic (four-corner) speaker system, or a 3.1 (front left, front center, front right, low frequency enhance) speaker system. Even though the ordering which has to be followed by the channels is known, there is also a need for the destination device to know the channel format. The various channel formats can be taken into account by specifying a channel mask in the metadata string. A channel mask indicates which speaker format is being specified in the metadata and the above ordering indicates the order in which metadata for these speakers is given in the fold-down matrix. The channel mask minimizes undesirable results on some speaker systems.

For example, the same channel mask may be the WAVEFORMATEXTENSIBLE channel mask used by WINDOWS brand multimedia products. When using a channel mask, a metadata name of the form "Fold % dto % DChannels % C" where % d represents M, % D represents N and % C represents the channel mask may be used. The content authoring application will fill out the name of the channel mask. As a result, the content playback application can determine the name based on the destination system's audio configuration.

Figure 4:
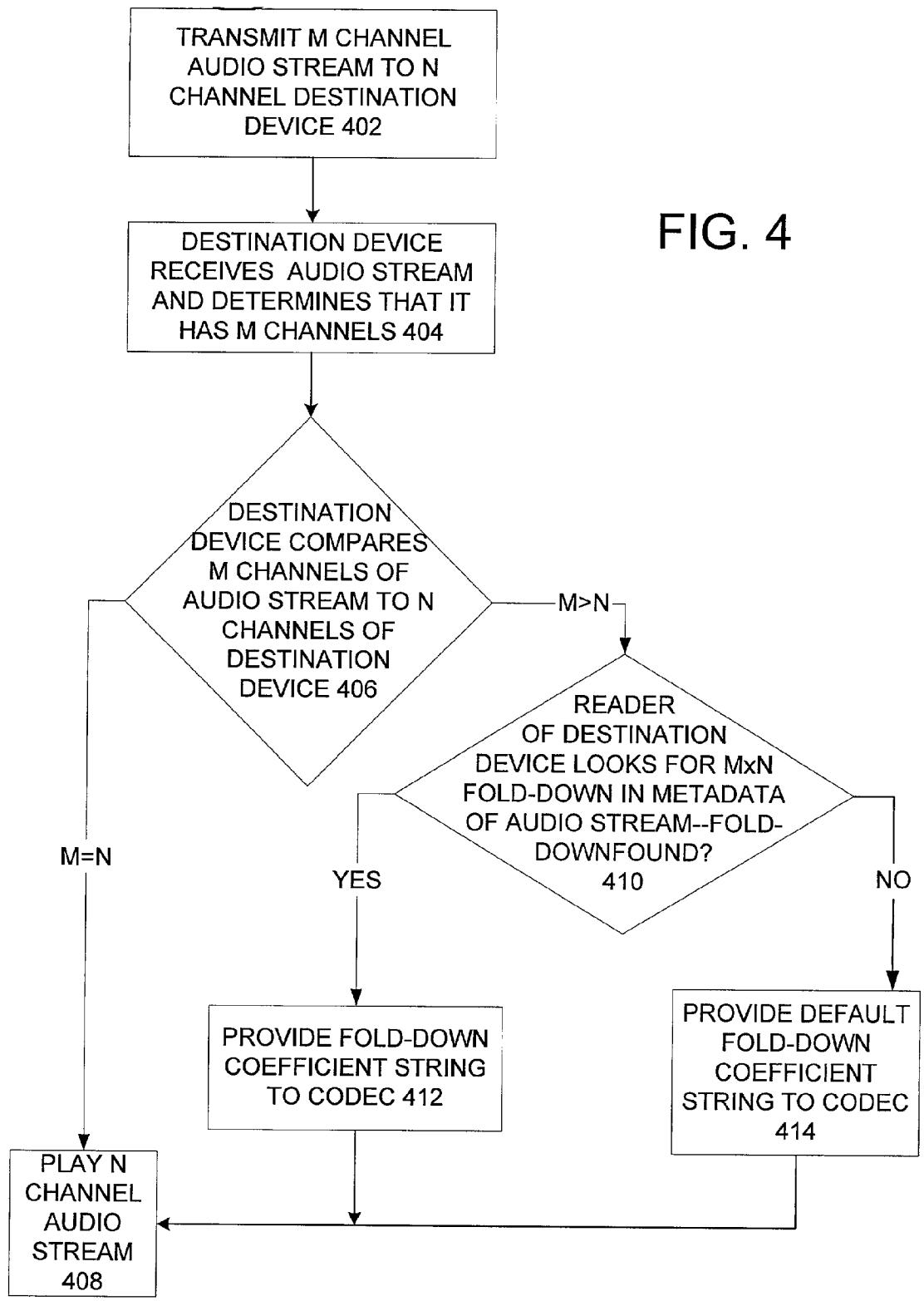
FIG. 4 is an exemplary flow chart illustrating operation of system and method of FIG. 1.

Referring next to FIG. 4, an exemplary flow chart illustrating operation of the system and method of FIG. 1 is shown. In general, FIG. 4 illustrates a method of transmitting an audio stream. At 402, an M channel audio stream is transmitted to an N channel destination device. This includes sending the audio stream having M channels of data, and sending the metadata specifying a fold-down function for converting the M channels of data of the audio stream into N channels of data. The remaining boxes of FIG. 4 illustrate receiving the data structure that holds the incoming audio stream of M channels of data. As noted above, the incoming stream may comprise samples that are stored in packets in the data structure and wherein a header of at least some of the packets includes fold-down data that was stored in the header prior to a request being transmitted by the computer system that caused the data structure to be received. In accordance with the invention, the fold-down data defines a function for converting the M channels of data of the incoming audio stream into N channels of data for use by a destination device. The destination device extracts the fold-down data from the header as needed to convert the incoming audio stream.

In particular, at 404 the destination device receives the audio stream and determines that it has M channels. At 406, the audio player or other software of destination device compares the M channels of the incoming audio stream to the N channels of the destination device. If M=N, the software proceeds to play the audio at 408. If M>N, the fold-down reader of the destination device looks for an M×N fold-down coefficient string in the received metadata of the incoming audio stream at 410. If the fold-down string is found, the software of the destination device provides the fold-down to the coding/decoding software at 412 for use in converting the M channels into N channels. If the fold-down string is not found, the software of the destination device provides a default fold-down to the coding/decoding software at 414 for use in converting the M channels into N channels. For example, the default fold-down may equally weight all incoming channels for use by each of the playback channels. Both 412 and 414 proceed to 408 to play the N-channel audio stream.

In one form, FIG. 4 illustrates the operation of a computer system operable for connecting to an ASF communications channel. Such a system would transmit an encapsulated audio stream of M channels of data into an aggregated data stream to be transmitted on the ASF communications channel. This would include the following:

determining a packet size for the communications channel;

storing, on a storage device (e.g., media 10 in FIG. 1), information about the aggregated data stream to form a header section in a data structure that defines the aggregated data stream;

storing, on the storage device, packets containing samples of data from the multiple data streams to form a data section in the data structure (e.g., 12 in FIG. 1);

designating a portion of the header for holding conversion data; and storing, on the storage device, conversion data in the designated portion of the header. As noted above, the conversion data defines a function for converting the M channels of data of the audio stream into N channels of data for use by a destination computer. The aggregated data stream is stored on the storage device prior to receiving a request for transmission of the aggregated data stream on the communications channel from the destination computer.

Figure 5:
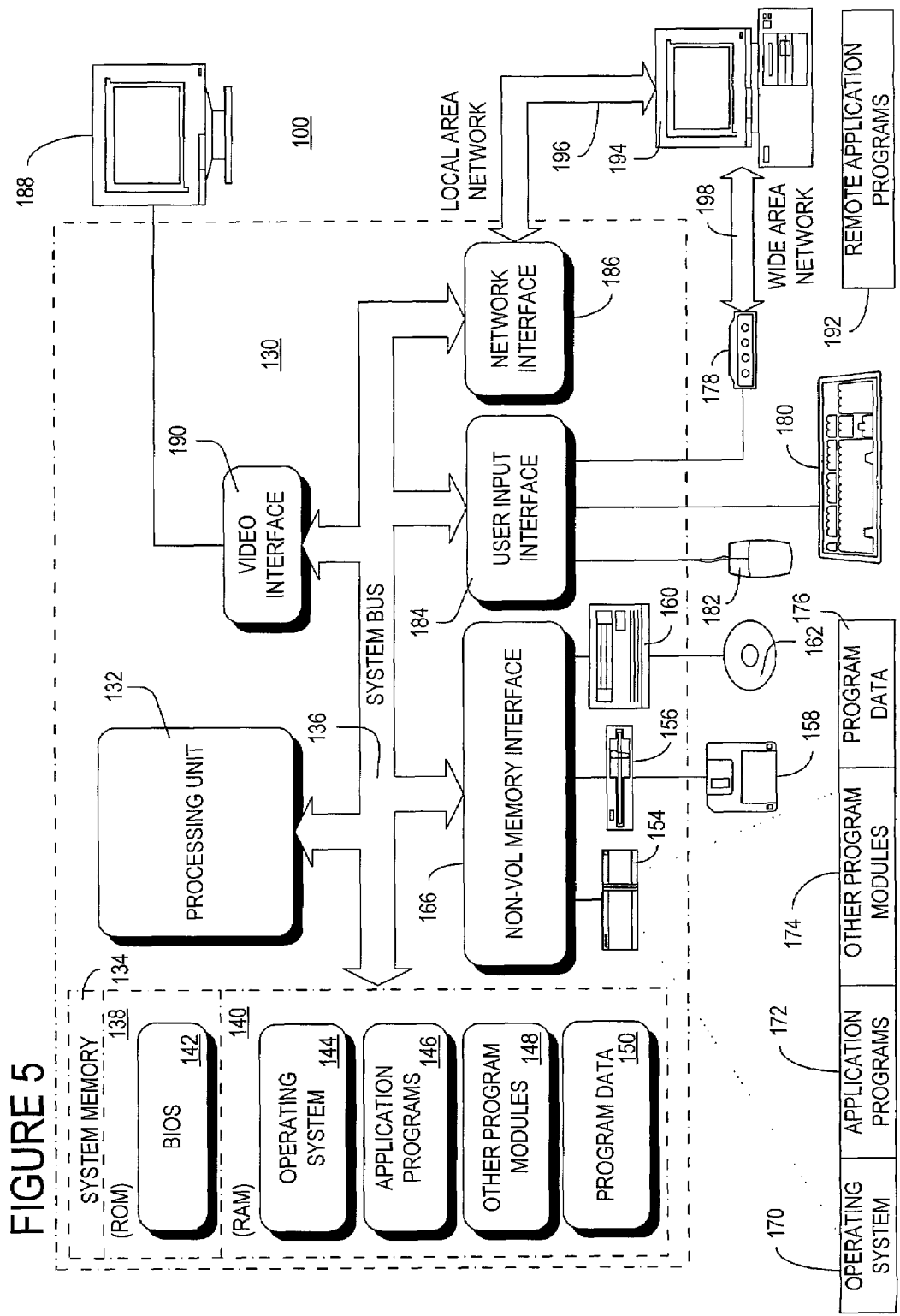
FIG. 5 is a block diagram illustrating one example of a suitable computing system environment on which the invention may be implemented.

FIG. 5 shows one example of a general purpose computing device in the form of a computer 130. In one embodiment of the invention, a computer such as the computer 130 is suitable for use as a transmitting device or a destination device in the context of the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media corresponding to media 10 of FIG. 1. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172 (including a media player according to the invention), other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing conununications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer readable medium having computer executable instructions stored thereon, the medium comprising:
   audio data having M channels and including a header wherein the header includes metadata specifying a conversion function for converting the M channels of the audio data into N channels of data;
   wherein the conversion function is a fold-down function specified by the metadata which includes a plurality of coefficients which define a conversion of a Y audio data set having M channels ($Y_1$–$Y_M$ channels) to an X audio data set having N channels ($X_1$–$X_N$ channels);
   wherein the coefficients comprise coefficients $K_{Aj}$ which define the fold-down as follows:

$$X_A = \sum_{j=1}^{M} K_{Aj} Y_j \quad \text{(for } A = 1 \text{ to } N\text{)};$$

wherein the audio data comprises a 5.1 audio stream having six channels having left front, right front, center, low frequency, left surround and right surround channels such that M=6, wherein the destination device comprises a stereo destination device having left and right channels such that N=2, wherein the coefficients include B, SMIX, CMIX and LFEMIX and wherein the fold-down function comprises:

$L(N)=B*[L(M)+SMIX*LS(M)+CMIX*C(M)+LFEMIX*LFE(M)]$ and $R(N)=B*[R(M)+SMIX*RS(M)+CMIX*C(M)+LFEMIX*LFE(M)]$ wherein:
   L(N) is the data for the left channel of the stereo destination device;
   L(M) is the left front channel data of the 5.1 audio stream;
   LS(M) is the left surround channel data of the 5.1 audio stream;
   C(M) is the center channel data of the 5.1 audio stream;
   LFE(M) is the low frequency channel data of the 5.1 audio stream;
   R(N) is the data for the right channel of the stereo destination device;
   R(M) is the right front channel data of the 5.1 audio stream; and
   RS(M) is the right surround channel data of the 5.1 audio stream; and
   wherein B=1/(1+SMIX+CMIX+LFEMIX).

2. A computer readable medium having computer executable instructions stored thereon, the medium comprising:
   audio data having M channels and including a header wherein the header includes metadata specifying a conversion function for converting the M channels of the audio data into N channels of data;
   wherein the conversion function is a fold-down function specified by the metadata which includes a plurality of coefficients which define a conversion of a Y audio data set having M channels ($Y_1$–$Y_M$ channels) to an X audio data set having N channels ($X_1$–$X_N$ channels)

wherein the coefficients comprise coefficients $K_{Aj}$ which define the fold-down as follows:

$$X_A = \sum_{j=1}^{M} K_{Aj} Y_j \quad (\text{for } A = 1 \text{ to } N);$$

wherein the audio data comprises a 5.1 audio stream having six channels having left front right front, center, low frequency, left surround and right surround channels such that M=6, wherein the destination device comprises a stereo destination device having left and right channels such that N=2, wherein the coefficients include B, SMIX, CMIX and LYEMIX and wherein the fold-down function comprises:

$L(N)=B*[R(M)+SMIX*LS(M)+CMIX*C(M)+LFEMIX*LFE(M)]$ and $R(N)=B*[R(M)+SMIX*RS(M)+CMIX*C(M)+LFEMIX*LFE(M)]$ wherein:
L(N) is the data for the left channel of the stereo destination device;
L(M) is the left front channel data of the 5.1 audio stream;
LS(M) is the left surround channel data of the 5.1 audio stream;
C(M) is the center channel data of the 5.1 audio stream;
LFE(M) is the low frequency channel data of the 5.1 audio stream;
R(N) is the data for the right channel of the stereo destination device;
R(M) is the right front channel data of the 5.1 audio stream; and
RS(M) is the right surround channel data of the 5.1 audio stream; and
wherein the fold-down function is based on the following mix table wherein;

|      | L(M)      | R(M)      | C(M) | LFE(M) | LS(M)     | RS(M)     |
|------|-----------|-----------|------|--------|-----------|-----------|
| L(N) | W         | -INFINITY | Y    | Z      | X         | -INFINITY |
| R(N) | -INFINITY | W         | Y    | Z      | -INFINITY | X         | wherein:
$W=20*65536*\log_{10}(B)$;
$X=20*65536*\log_{10}(SMIX*B)$;
$Y=20*65536*\log_{10}(CMIX*B)$;
$Z=20*65536*\log_{10}(LFEMIX*B)$; and
-INFINITY represents negative infinity.

3. The medium of claim 2 wherein the metadata includes the following string format representation for the mix table:
W,-INFINTE,-INFINTE,W,Y,Y,Z,Z,X,-INFINTE,-INFNITE,X.

4. The medium of claim 1 wherein the conversion function is specified in a separate data stream of the audio data and may be continuously varying.

5. The medium of claim 1 wherein a metadata name for the conversion function comprises "Fold % dto % DChannels % C" where % d represents M, % D represents N and % C represents a channel mask.

6. The medium of claim 1 wherein the metadata comprises a channel mask.

7. The medium of claim 2 wherein the conversion function is specified in a separate data stream of the audio data and may be continuously varying.

8. The medium of claim 2 wherein a metadata name for the conversion function comprises "Fold % dto % DChannels % C" where % d represents M, % D represents N and % C represents a channel mask.

9. The medium of claim 2 wherein the metadata comprises a channel mask.

10. The medium of claim 3 wherein the conversion function is specified in a separate data stream of the audio data and may be continuously varying.

11. The medium of claim 3 wherein a metadata name for the conversion function comprises "Fold % dto % DChannels % C" where % d represents M, % D represents N and % C represents a channel mask.

12. The medium of claim 3 wherein the metadata comprises a channel mask.

* * * * *

UNITED STATES PATENT AND TRADEMARK OFFICE
CERTIFICATE OF CORRECTION

| | | |
|---|---|---|
| PATENT NO. | : 7,072,726 B2 | Page 1 of 1 |
| APPLICATION NO. | : 10/175431 | |
| DATED | : July 4, 2006 | |
| INVENTOR(S) | : Wilson et al. | |

It is certified that error appears in the above-identified patent and that said Letters Patent is hereby corrected as shown below:

In column 11, line 24, after "information" insert -- such as computer readable instructions, data structures, program modules or other data. For --.

In column 12, line 56, delete "conununications" and insert -- communications --, therefor.

In column 15, line 11, in Claim 2, insert -- , -- after "front".

In column 15, line 16, in Claim 2, delete "LYEMIX" and insert -- LFEMIX --, therefor.

In column 15, line 19, in Claim 2, delete "L(N)=B*[R(M)" and insert -- L(N)=B*[L(M) --, therefor.

Signed and Sealed this

Thirtieth Day of March, 2010

David J. Kappos
*Director of the United States Patent and Trademark Office*